United States Patent [19]

Nakamura

[11] Patent Number: 5,252,812
[45] Date of Patent: Oct. 12, 1993

[54] PROGRAM CONTROL SYSTEM FOR PORTABLE DATA STORAGE DEVICE

[75] Inventor: Takashi Nakamura, Ibaraki, Japan
[73] Assignee: Hitachi Maxell, Ltd., Osaka, Japan
[21] Appl. No.: 651,545
[22] Filed: Feb. 6, 1991
[30] Foreign Application Priority Data
  Feb. 17, 1990 [JP] Japan .................................. 2-35096
[51] Int. Cl.⁵ .......................... G06K 19/06; G06F 9/00
[52] U.S. Cl. .................................. 235/380; 235/492; 235/381; 395/425
[58] Field of Search .............. 235/380, 492, 379, 381, 235/441; 395/425; 902/39, 40

[56] References Cited

U.S. PATENT DOCUMENTS

| | | | |
|---|---|---|---|
| 4,028,684 | 6/1977 | Divine et al. ........................ | 395/425 |
| 4,506,346 | 3/1985 | Bennett et al. ...................... | 364/900 |
| 4,703,416 | 10/1987 | Crupi et al. .......................... | 395/425 |
| 4,777,355 | 10/1988 | Takahira .............................. | 235/380 |
| 4,829,169 | 5/1989 | Watanabe ............................. | 235/492 |
| 4,920,478 | 4/1990 | Furuya et al. ....................... | 395/425 |
| 5,136,700 | 8/1992 | Thacker .............................. | 395/425 |

FOREIGN PATENT DOCUMENTS 0354793 10/1989 European Pat. Off. .

*Primary Examiner*—John Shepperd
*Assistant Examiner*—Esther Chin

[57] ABSTRACT

A program control system is provided for a portable data storage device. The portable storage device includes a main processing unit (MPU), a first memory which is a fixed memory for storing non-rewritable fixed programs to be accessed from the MPU and a second memory for which read/write for any program can be carried out by the MPU. The second memory includes a priority control management table for storing index information of several kinds of programs having the same program actuating numbers as those of the fixed programs stored in the first memory, and a program area for storing programs corresponding to the index information on the priority control management gable. A priority controller is provided in the first memory in order to search the priority control management table when a prescribed program is accessed by the MPU. If the index information of the prescribed program is present on the priority management table, the program in the program area designated by the index information will be executed. Whereas if the index information is not present, the pertinent program in the first memory will be executed.

17 Claims, 7 Drawing Sheets

F I G. 1
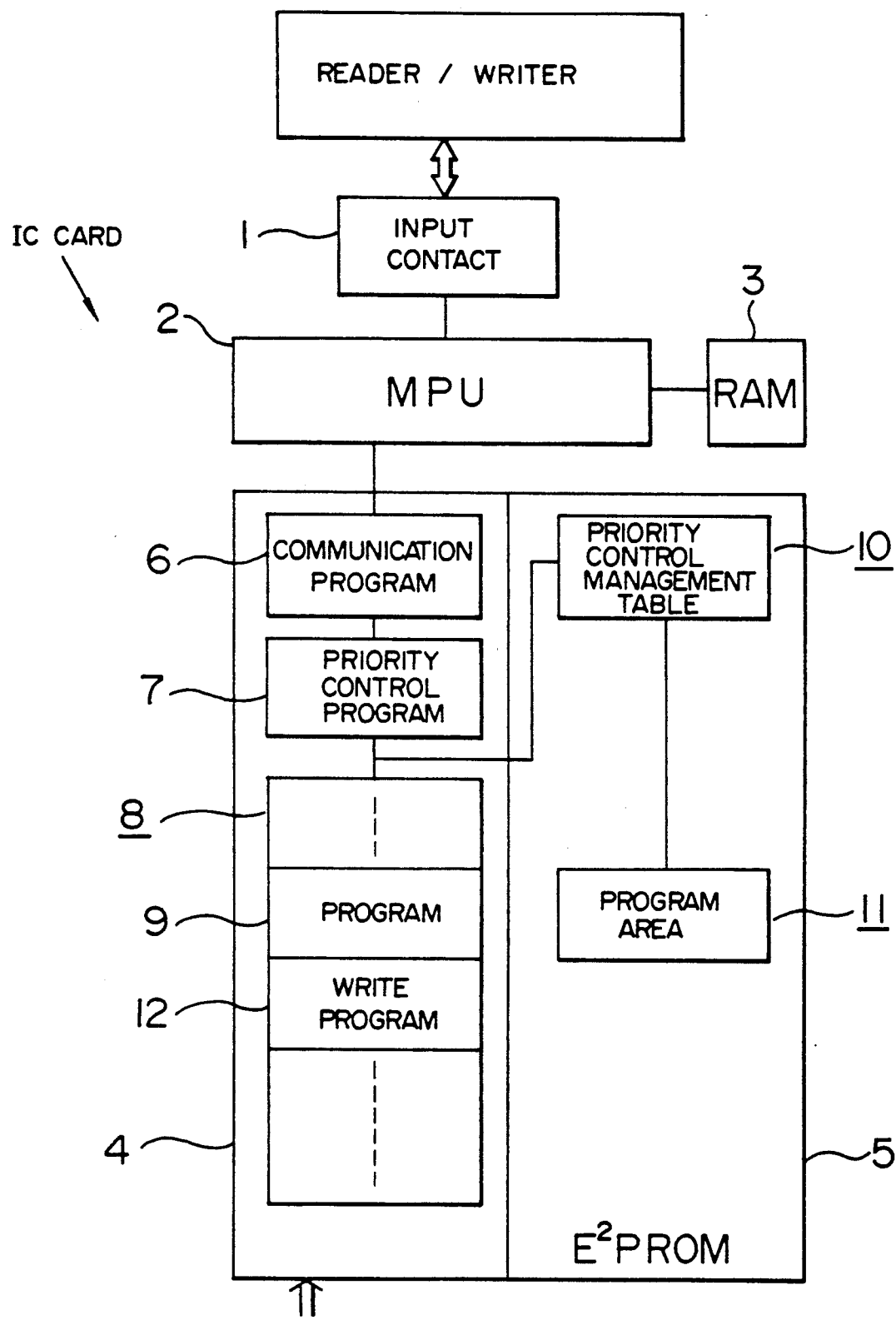

FIG. 2A

PRIORITY CONTROL MANAGEMENT TABLE

| ¥n | ADDRESS | LENGTH |
|---|---|---|
| PROGRAM NUMBER | STARTED BASE ADDRESS | SIZE (LENGTH) OF PROGRAM |

FIG. 2B

| $¥_1$ | 3200 | 3FF | $¥_2$ | 35FF | 100 |
|---|---|---|---|---|---|
| $¥_3$ | 36FF | 200 | $¥_4$ | 38FF | 10 |
| $¥_5$ | 3910 | 20 | $¥_6$ | 3930 | A |
| $¥_7$ | 393A | 10 | | | |

PROGRAM CONTROL SYSTEM FOR PORTABLE DATA STORAGE DEVICE

BACKGROUND OF THE INVENTION

The present invention relates to a program control system which is preferably used for a portable data storage device such as an IC card, a memory card and a non-contact IC card.

Generally, the IC card or memory card includes, in addition to a memory for storing user data, a MPU (main processing unit) for performing several processing operations such as decision of commands from a reader/writer, read/write of user data for the memory in response to a command, communication, check of a code number used for security protection of the user data stored in the memory and cryptography (encryption/decryption), and another memory in cooperation with CPU for storing several programs for executing these processing operations by means of the MPU.

There are two conventional techniques for these programs. The first technique is to use a mask ROM (read only memory) in which all necessary programs are stored. The second technique is to use a mask ROM in which control programs for basic processing operations of the MPU are stored, and a PROM (programmable read-only memory) in which an application program for each user is stored. The PROM includes an EPROM (erasable programmable read-only memory), and an EEPROM (electrically erasable programmable read-only memory where; the user data are also stored in the PROM.

Meanwhile, the storage capacity of the semiconductor memory such as the EPROM and the EEPROM is limited to a certain degree. Therefore, it is desirable for such a semiconductor memory to enlarge a user area for storing user data to a possible maximum limit to increase the possible storage capacity of the user data.

In view of this, the above first technique in which all the programs are stored in a mask ROM is preferable. This technique, however, has disadvantages that the programs cannot be modified so that this technique cannot deal with the requests of changing program(s) for a standard command processing due to development of standardization and the processing for cryptography and communication, of adding a new program, and of replacing a certain program by another program.

On the other hand, the above second technique, in which only the basic program necessary for operating the MPU is stored in the mask ROM and the other processing programs (alternative programs) are stored in the PROM, can deal with the above requests of modification, or addition of a part of the basic program and/or replacement of the whole basic program. This technique, however, also has a disadvantage that the mask ROM, in which only the basic program is stored, has a very low use efficiency and is therefore used in an unsatisfactory manner.

SUMMARY OF THE INVENTION

An object of the present invention is to provide a program control system for a portable data storage device which can enhance the use efficiency of a memory and also deal with change, addition and/or replacement of a program in a satisfactory manner.

In order to attain the above object, the program control system according to the present invention comprises, as program memories for the MPU, a first memory which is a ROM for previously storing all necessary programs and a second memory which is a PROM which can store alternative or replacement programs relative to the necessary programs, and priority control means.

The MPU, by means of the priority control means, searches a list of programs stored in the second memory prior to the first memory; then, the MPU, if the program designated by an input command is included in the list, executes that program, and only if not, executes the designated program stored in the first memory.

The second memory stores a modified program and a replacement program for programs stored in the first memory and/or a program to be newly added. For example, if in the state where a replacement program for the program stored in the first memory is previously stored in the second memory, these programs are designated, the replacement program stored in the second memory will be preferentially executed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a view showing the arrangement of an IC card connected with a reader/writer according to an embodiment of the present invention;

FIGS. 2A and 2B are views showing the priority control management table stored in a PROM in the IC card;

DESCRIPTION OF THE PREFERRED EMBODIMENTS

Figure 3:
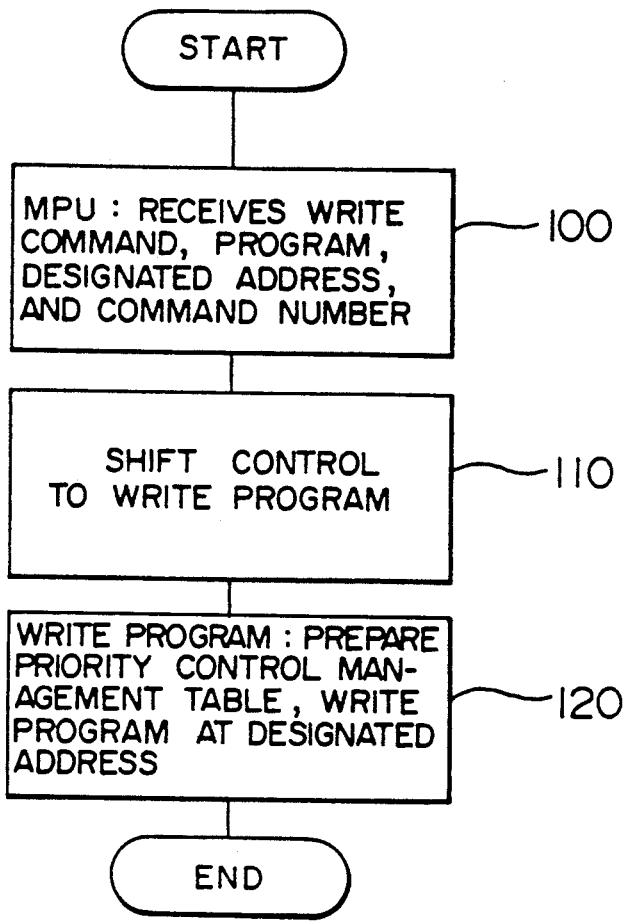
FIG. 3 is a flowchart showing the procedure of writing an alternative program in the program area of the PROM in an IC card.

Now referring to the drawings, an explanation will be given for the embodiments of the present invention.

FIG. 1 is a block diagram of a program control system according to an embodiment of the present invention when the control system is applied to an IC card. In FIG. 1, reference numeral 1 is an input contact; reference numeral 2 is a MPU; reference numeral 3 is a RAM (random access memory); reference numeral 4 is a mask ROM; reference numeral 5 is a PROM; and reference numerals 6 to 12 are program areas in which several kinds of program are stored, respectively.

The input contact 1, connected with a reader/writer, serves to receive/transmit data or commands from/to the reader/writer on the basis of a direction from the MPU 2. The MPU 2 serves to execute, in accordance with the programs 6 to 12 stored in the respective program areas of the mask ROM 4, start management, control of the input contact 1, and the processing for user data and/o commands and a code number using the RAM 3. The PROM 5 may be an EEPROM, for example, having a data area with a storage capacity of about 8 K bytes within which a priority control management table 10 and a program area 11 are partially located. The RAM 3 may have a storage capacity of about 256 bytes.

As a matter of course, several programs stored in the mask ROM 4 exist before the mask ROM is incorporated in the IC card. If modification, addition and/or replacement relative to a program occur after the IC card has been used, an alternative program (for modification, addition of a part of original program and replacement of the whole original program) will be stored in the program area 11 of the PROM 5. Furthermore, whenever a program is stored in the PROM 5, the data indicative of its position is stored on the priority control table 10.

Such an operation is carried out in the communication processing with DES (data encryption standard) defining the system of encryption by communication and RSA or protocol including $T=1$ (communication protocol in ISO), $T=140$ (ISO protocol proposed by Japanese), $T=0$, etc., and also in a command processing which uses several kinds of options. Although described later, for example, it is assumed that a control program has been stored in the mask ROM 4 of the IC card in fabricating the IC card so that the communication between a reader/writer and the IC card is carried out under the encryption system DES and the protocol of $T=1$. Thereafter, if the communication is to be carried out under RSA, $T=14$ in view of security, the control program base on this protocol will be stored in the PROM 5 such as an EEPROM.

In order for a program or program module to be writable in the PROM 5, a write program 12 is previously stored in a specific area of the mask ROM 4 and the MPU 2, when receiving a command of writing an alternative program, will execute the write program 12. Furthermore, in order for the MPU 2 to execute the program stored in the PROM 5, a priority control program 7 is previously stored in the mask ROM 4. It is assumed that the priority control program 7 is stored in a predetermined program area of the mask ROM 4. Additionally, a communication program 6 for controlling the input contact 1 is stored in another area of the mask ROM 4 and the program 9 for each user is stored in the program area 8. The program 9 for each user includes file management (R/W) of data stored in the PROM 5, directory management, lock/unlock of a card, checking PIN (code number), etc.

As seen from FIG. 2A, a priority control management table is composed of a program number for identifying each program, the base address of the section of storing the program and data indicative of the size of the program. The program number of each program is arranged to be equal with the program number of a corresponding program stored in the program area 8. For example, as seen from FIG. 2B, the program of the program No. ¥1 is stored in the area starting from the address of 3200 (in a hexadecimal notation) of the PROM 5 and has the size corresponding to the address of 3FF.

Referring to the flowchart of FIG. 3, an explanation will be given for the procedure of writing or storing an alternative program (relative to modification, addition and replacement) in the PROM 5. First, the IC card is initialized. Next, the MPU 2 receives a write command, a program following the write command, a designated address in the program area and a command number of starting the program (Step 100). Then the MPU 2 shifts its control operation to the write program 12 (Step 110). Thereafter, on the basis of the write program 12, the MPU 2 prepares the priority management table 10 and also writes the alternative program at the designated address in the program area 11 (Step 120). Thus, if a search is made of whether or not each command input from the reader/writer is stored in the priority control management table 10, the specific program stored can be started.

Figure 5:
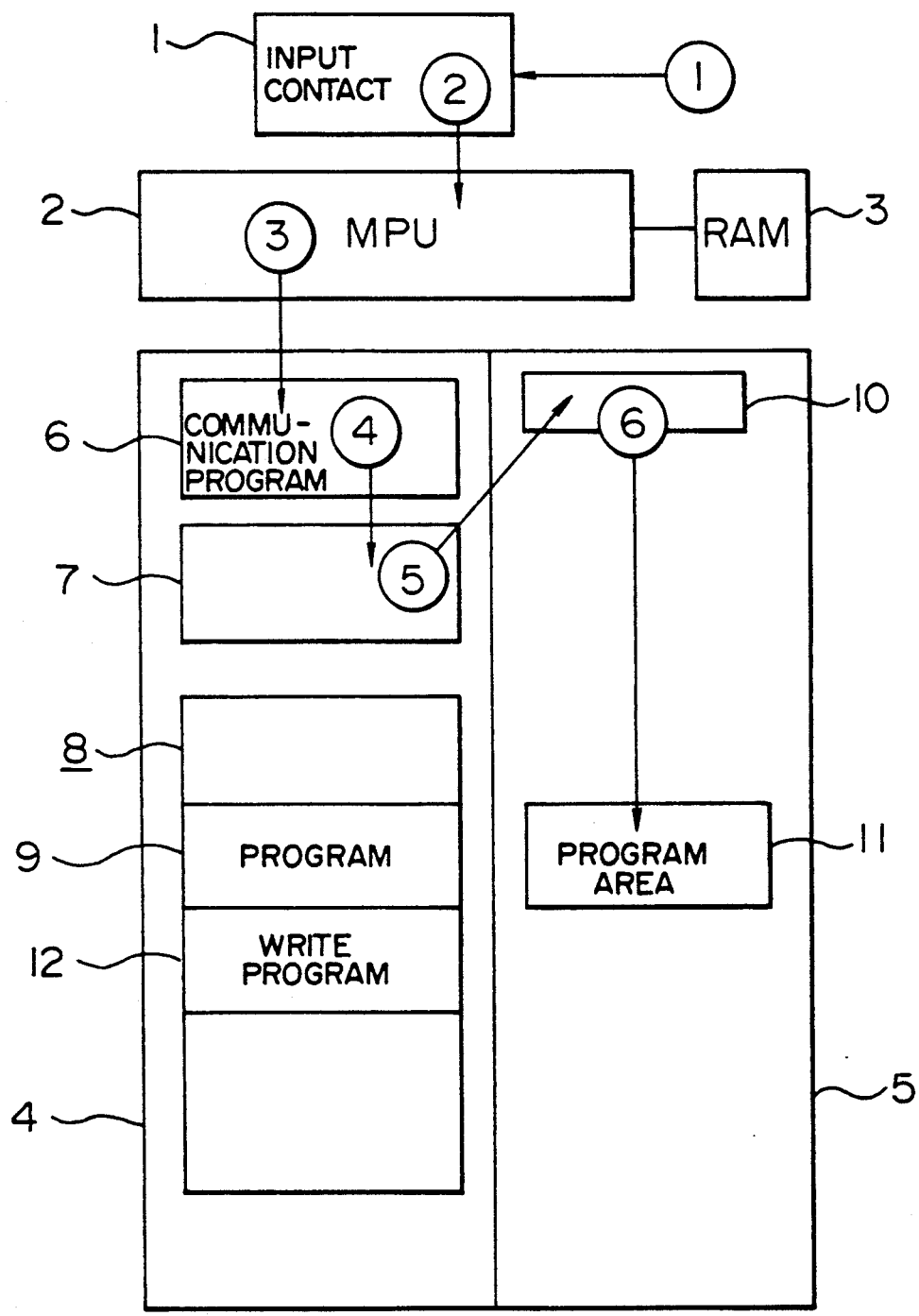
FIG. 5 is a view showing the processing when an alternative program corresponding to a received command exists in a PROM.
Figure 7:
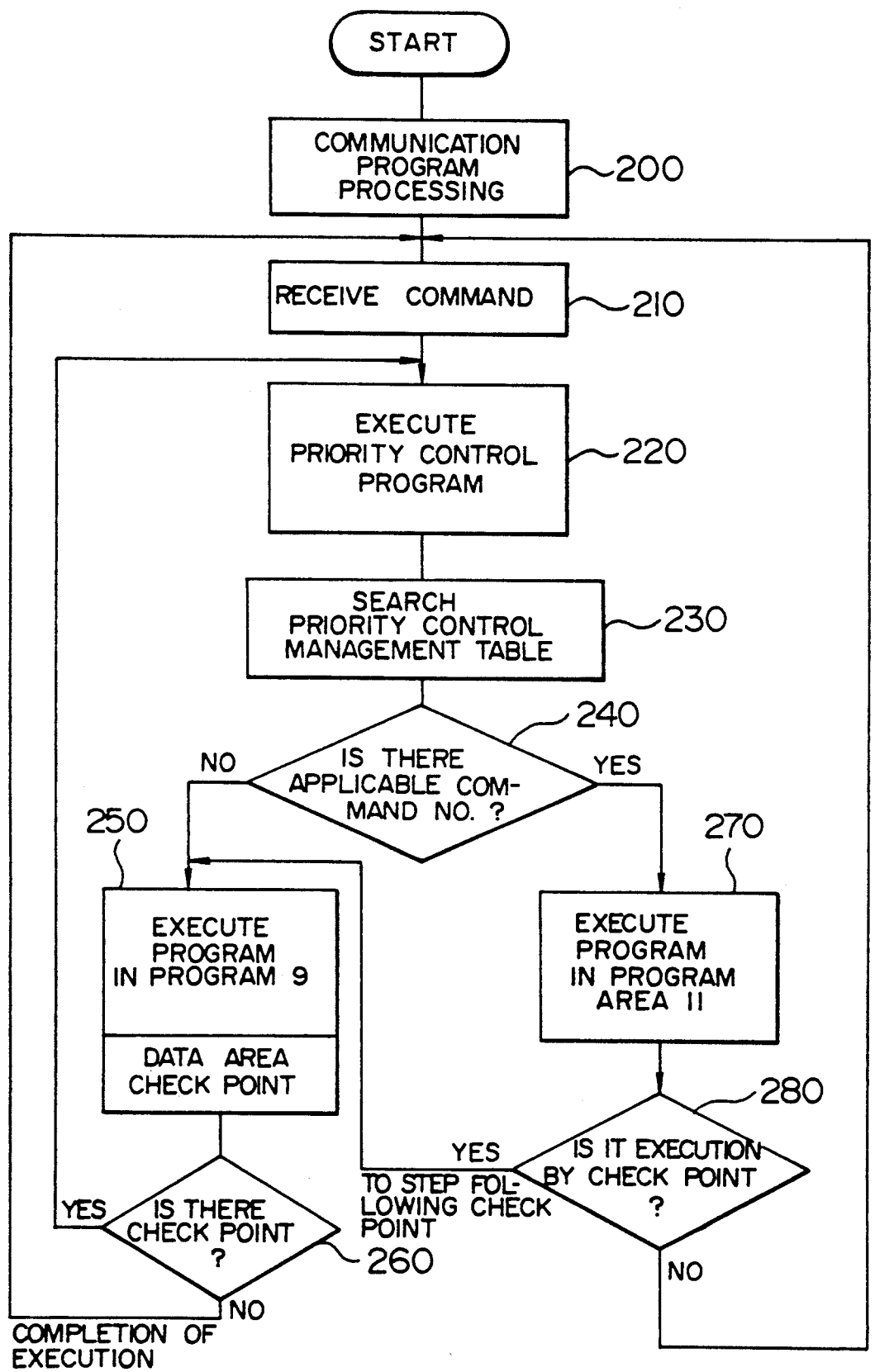
FIG. 7 is a flowchart showing the processings in FIGS. 5 and 6.

An explanation will be given for the process of executing the command received from the reader/writer. FIG. 5 shows the flow of operations (①,②...) in the case where the program corresponding to the received command is stored in the PROM 5. The operation flow in FIG. 5 will be explained with reference to the flowchart of FIG. 7 showing changes in the control state of the MPU 2.

First, when the IC card is connected with the reader/writer, the IC card is initialized in the processing of a communication program (Step 200). A command (FIG. 5 ①) from the reader/writer is input to the MPU 2 through the input contact 1 (FIG. 5 ②) in a stand-by state(FIG. 5 ③; FIG. 7 Step 200). Then, the MPU 2 reads the communication program 6 (FIG. 5 ④) stored in the mask ROM 4, and executes the communication program 6 to place the input contact 1 in a data transmission/reception enabling state for the reader/writer. Thereafter, the MPU 2 reads the priority control program 7 (FIG. 5 ⑤) stored in the mask ROM 4 and executes the priority control program 7 to search the program number (¥1, ¥2, ... in FIG. 2B) designated by the received command on the priority control management table 10 in the PROM 5 (FIG. 5 ⑤, Step 230). Since it is now assumed that the program number designated by the received command exists on the priority control management table 10, the presence of the program corresponding to the received command is detected and the storage position (address) thereof is also detected (FIG. 7 Step 240). The MPU 2 shifts its control operation to the storage address in the program area 11 to execute the alternative program for the predetermined program stored in the mask ROM 3 (FIG. 7 Step 270).

Furthermore, the same program number is generally allotted to the predetermined program stored in the program area 8 in the mask ROM 4 and, to the alternative program stored in the PROM 5 therefore inn view of a user's convenience ,so that after ,the alternative program is once stored, the alternative program will be automatically operated. Now, it is assumed that the alternative program corresponding to a change in the program 9 in the mask ROM 4 has been stored in the program area 11 in the PROM 5. In this case, if the received command is directed to the program module 9, the MPU 2 necessarily executes the alternative program corresponding to the change in the program module 9 stored in the program area 11 in the mask ROM 5. Specifically, if there are alternative programs for the program corresponding to the same command, the MPU 2 will preferentially execute the program stored in the PROM 5 with the aid of the priority control program 7.

Figure 6:
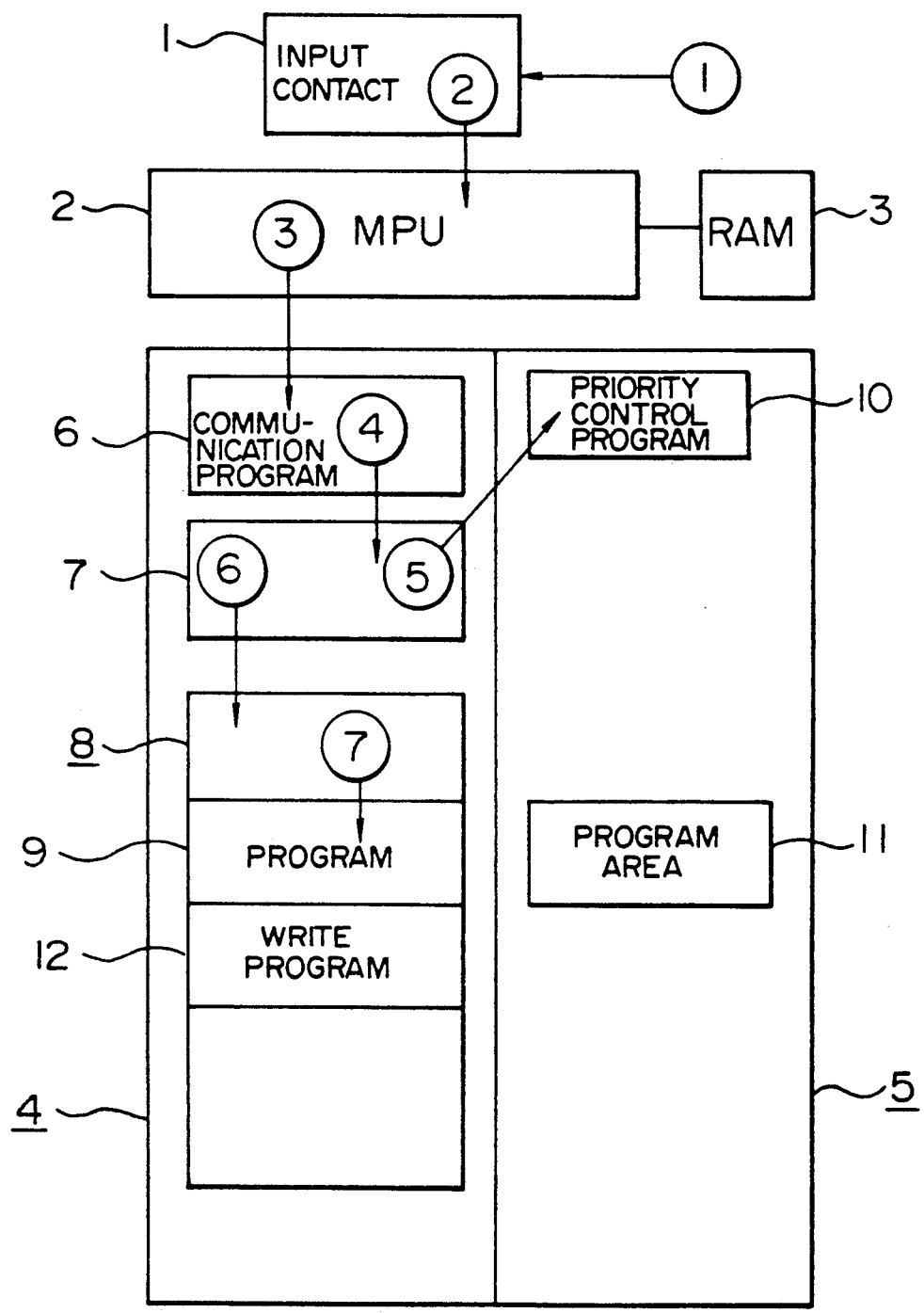
FIG. 6 is a view showing the processing when an alternative program corresponding to a received command does not exist in the PROM.

FIG. 6 shows the flow of operations (①, ② ...) in the case where the program corresponding to the received command is not stored in the PROM 5. The operation flow in FIG. 5 will be explained with reference to the flowchart of FIG. 7.

As in the case of FIG. 5, when the MPU 2 receives a command from the reader/writer (FIG. 7 Step 210), the MPU 2 executes the communication program 6 stored in the mask ROM 4 (FIG. 6 ①-④). Thereafter, the MPU 2 executes the priority control program 7 (FIG. 6 ⑤) stored in the mask ROM 4 to search the program number corresponding to the received command on the priority control management table 10 stored in the PROM 5 (FIG. 7 Step 230). In this case, it is assumed that there is no alternative program for the program previously stored in the program area 8 of the mask ROM 4. When the MPU 2 decides this, the MPU 2 starts to search the program in the program area 8 (FIG. 6 ⑥), and reads the program in the program area corresponding to the received command and executes it (FIG. 6 ⑦, FIG. 7 Step 250).

Meanwhile, some programs 9 are due to make a change. Therefore, it is possible to previously locate the number (check point) indicative of the change at a certain point of the program 9 (¥20 in the program illustrated in FIG. 4) and can be stored in the program area. The content of the change which means addition of a step can be stored on the priority management table 10 using the designated number ¥20 and also the corresponding program can be stored in the program area 11 in the PROM 5 in the same manner as in the case of FIG. 3.

Figure 4:
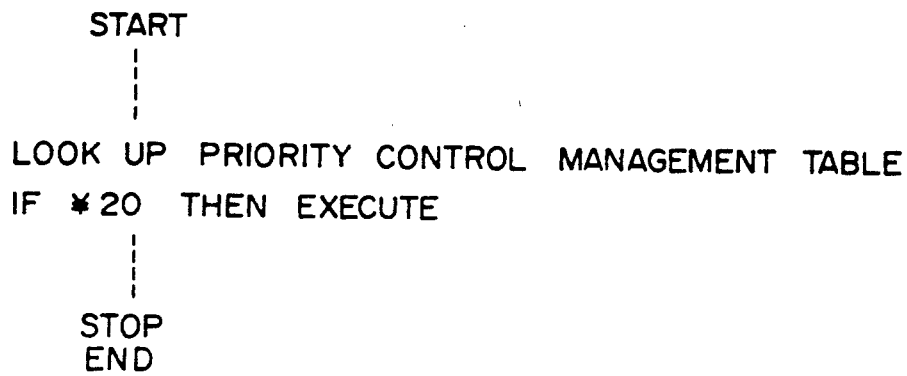
FIG. 4 is a view showing an example of the program indicative of a check point inserted in the program stored in a non-programmable or rewritable memory in an IC card.

Thus, if the MPU 2, reaches the check point (FIG. 7 Step 260) while the MPU 2 executes the program in the program 9 (FIG. 7 Step 250), the MPU 2 executes the priority control program 7 (Step 220) to search the priority control management table 10 (step 230). If the presence of the command number corresponding to the check point as a result of checking is decided (step 240), the MPU 2 executes the corresponding alternative program stored in the program area 11. Thereafter, if the execution of the program due to the check point is decided in Step 280, the process at issue is returned for executing the original program in Step 250 to advance the next step at the check point. Thus, if the check point as shown in FIG. 4 is located at a certain point of the program module, it is possible to search the priority control management table 10 with the aid of the decision in Step 260 and execute the alternative part of corresponding program in the program area 11 to add any program to the program previously stored in the mask ROM 4. Further, if a jump instruction such as "JUMP TO 500" is stored at a predetermined step of the pertinent program in the program area 11, the program previously stored in the mask ROM 4 can be rewritten so as to skip its unnecessary part.

As described above, in accordance with this embodiment, with the aid of the priority control program 7, the MPU 2 executes the program stored in the PROM 5 prior to the program with same number as the former stored in the mask ROM 4. The program stored in the mask ROM 4 will only be executed if there is no corresponding program in the PROM 5, the program stored. Therefore, if with all necessary programs stored in the mask ROM 4, an alternative program (relative to modification of the original program using the command number (check point), addition of some programs, and rewrite of the entire program using the actuating command itself of the original program) is stored in the PROM 5 as necessity requires, and this alternative program will be preferentially executed. Thus, if the alternative program for the program stored in the mask ROM 4 is stored in the PROM 5, the alternative program will be necessarily executed in place of the program stored in the mask ROM 4. Thus, the embodiments of the present invention can easily deal with requests of modification, addition and replacement of a program in an IC card.

Furthermore, since all necessary programs are previously stored in the mask ROM 4 the mask ROM can be effectively used with improved use efficiency. Since the storage capacity required for program modification, addition and replacement is greatly limited, the storage capacity in which user data can be stored in the PROM 5 is not particularly restrained.

Furthermore, it should be noted that the above embodiment can be applied to not only modification, addition and replacement of an application program for each user but also to any program such as a communication program. For example, if the communication system is changed, its alternative program may be stored in the PROM 5.

Figure 8:
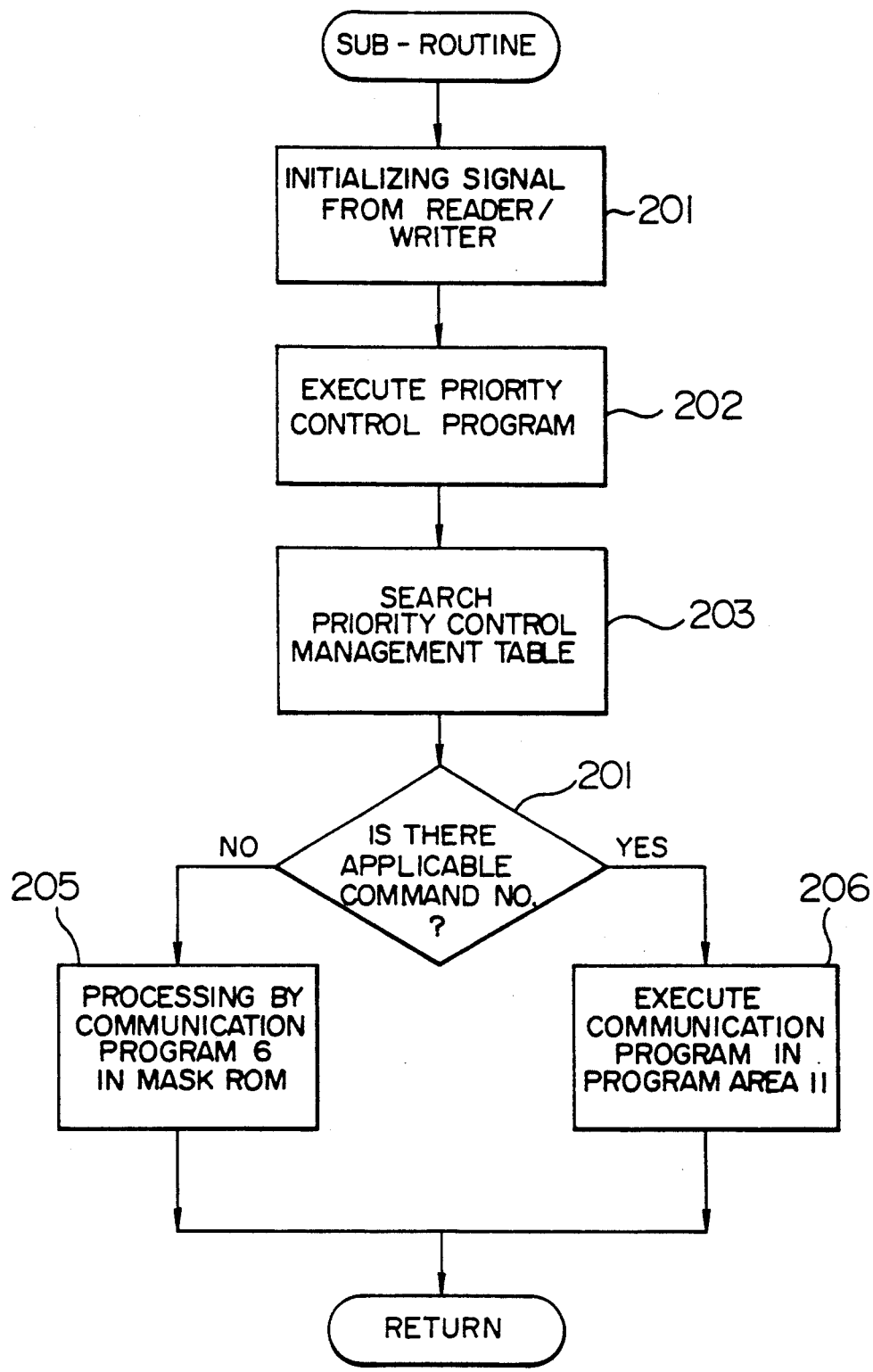
FIG. 8 is a flowchart showing the subroutine of the processing in response to accessing in a different communication system.

Specifically, the communication can be changed by replacing the communication program processing (Step 200) in FIG. 7 by the sub-routine processing as shown in FIG. 8 which will be carried out in the following process. First, when an initializing signal is received from the reader/writer (step 200), another priority control program located in the sub-routine is executed (Step 202) to search the priority control management table 10 (Step 203). If the command number for the control program corresponding to the communication system at issue is present on the priority control management table 10 (Step 204), the corresponding control program stored in the program area 11 will be executed (Step 206). If the command number is not present, the communication control will be implemented using the communication program of the original communication system previously stored in the mask ROM 4. Thus, also in the case of changing the communication program, in accordance with the procedure shown in FIG. 3, the same command number as the command number actuating the original communication system may be stored on the priority control management table 10 and also an alternative communication program may be stored in the program area 11.

Further, the data to be stored in the PROM 5 can be managed using the priority control management table 10 as shown in FIGS. 2A and 2B. This permits a vacant storage area in the PROM 5 to be easily found and new data/programs to be stored for a short time. In this case, the data and the programs may be distinguished in such a manner that they are labelled with distinguishable symbols, (e.g. $ for the data and ¥ for the program). Furthermore, the areas for storing the programs and the data may be pre-sectioned. In the case of managing both data and programs, the programs and data may be stored without distinguishing them from each other from the one side of the PROM in the order of their inputting.

Furthermore, all the data stored in the PROM 5 may be once read out and thereafter stored in their new layout with a new program to be added.

If a specification for preparing a program is given to a user, the user himself can prepare a new program to be added. Therefore, in the card (ISO card) under the electrical and physical condition (ISON 7816/1-3) relied on the ISO standard, the priority control program has only to be added for preparing the new program.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A program control system for a portable data storage device comprising:
    a main processing unit (MPU) for starting an internal program on the basis of an input/output requesting signal from a predetermined external device;
    a first memory which is a fixed memory for storing non-rewritable fixed programs to be accessed from said MPU;
    a second memory for which read/write for any program can be carried out by means of said MPU; and
    said second memory comprising a priority control management table for storing index information of several kinds of programs relative to said fixed programs stored in said first memory, and a program area for storing programs corresponding to said index information on said priority control management table,
    so that when a prescribed program is accessed by said MPU on the basis of the input/output requesting signal from said predetermined external device, said priority management table is searched, and if the index information of said relative program is present on said priority management table, the program in said program area designated by said index information will be executed and if the index information of said relative program fails to be present on said priority management table, the pertinent program in said first memory will be executed.

2. A program control system according to claim 1, wherein the program to be stored in said second memory is an alternative program for the fixed program, and said alternative programs have the same program number as the corresponding fixed program.

3. A program control system according to claim 2, wherein said alternative program to be stored in said second memory is a partially modified program and/or partially added program for said fixed program, a check point with a predetermined command number is previously assigned at a position of said fixed program corresponding to said partially modified and partially added part of said fixed program, the index information of the partially modified program and/or partially added program including said predetermined command number of said check point is stored on said priority control management table and also said partially modified program and/or said partially added program themselves are stored in said program area of said second memory.

4. A program control system according to claim 3, wherein after executing said partially modified program or said partially added program, said MPU executes said fixed program again from the part following the check point thereof.

5. A program control system according to claim 3, wherein a first communication program for communication control between said predetermined external device and the portable data storage device is stored in said first memory; the index information of a second communication program having the same program actuating number as said first communication program is stored in said priority control management table; said second communication program, which is provided for communication control between said predetermined external device and the portable storage device in the communication system and is different from said first communication program, is stored in said program area of said second memory at the position corresponding to said index information; said first communication program, when accessed from said MPU, searches said priority control management table to decide if the pertinent program actuating number is present on said priority control management table; and if the pertinent program actuating number is present, the communication control is carried out through the communication system defined by said second communication program and if the pertinent program actuating number fails to be present, the communication control is carried out through the communication system defined by said first communication program.

6. A program control system according to claim 1, wherein said fixed program stored in said first memory includes a write program for writing a program to be stored in said second memory; in response to a write command from said predetermined external device, said MPU executes said write program to store the index information including the program actuating number of a program to be stored in said second memory on said priority control management table and to store the program in said program area of said second memory at the position designated by said index information.

7. A program control system according to claim 5, wherein said first communication program stored in said first memory is a communication control program defining a first predetermined control protocol and said second communication program stored in the program area of said second memory is a communication control program defining a second predetermined communication protocol.

8. A program control system according to claim 5, wherein said first communication program stored in said first memory is a communication control program defining a first predetermined cryptography communication and said second communication program stored in the program area of said second memory is a communication control program defining a second predetermined cryptography communication.

9. An IC card having a program control system comprising:
    a main processing unit (MPU) for starting an internal program on the basis of an input/output requesting signal from a predetermined external device;
    a first memory which is a fixed memory for storing non-rewritable fixed programs to be accessed from said MPU;
    a second memory for which read/write for any program can be carried out by means of said MPU; and
    said second memory comprising a priority control management table for storing index information of several kinds of programs relative to said fixed programs stored in said first memory, and a program Area for storing programs corresponding to said index information on said priority control management table, so that when a prescribed program is accessed by said MPU on the basis of the input/output requesting signal from said predetermined outer device, said priority management table is searched, and if the index information of said relative program is present on said priority management table, the program in said program area designated by said index information will be executed and if the index information of said relative program fails to be present on said priority management table, the pertinent program in said first memory will be executed.

10. A method for controlling programs in a portable data storage device having a fixed memory storing nonrewritable fixed programs to be accessed and a writable second memory having a program area and a priority control management table, comprising the steps of:

(a) starting an internal program by a main processing unit (MPU) on the basis of an input/output requesting signal from a predetermined external device;

(b) storing index information of several kinds of alternate or replacement programs relative to said fixed programs stored in first memory in said priority control management table;

(c) storing alternate or replacement programs corresponding to said index information on said priority control management table in a program area of said second memory;

(d) searching said priority management table when a prescribed program is accessed by said MPU on the basis of said input/output requesting signal from said predetermined external device;

(e) executing the program in said program area designated by said index information if said index information of said relative program is present on said priority management table in response to the search at said step (d); and (f) executing the pertinent program in said first memory if said index information of said relative program fails to be present on said priority management table in response to the search at said step (d).

11. A method for controlling programs according to claim 10, wherein said alternative or replacement programs stored at said step (c) have the same program number as the corresponding fixed program.

12. A method for controlling programs according to claim 11, wherein said alternative or replacement programs to be stored at said step (c) are partially modified programs and/or partially added programs for said fixed program, a check point with a predetermined command number is previously assigned at a position of said fixed program corresponding to said partially modified and partially added part of said fixed program, said index information including said predetermined command number of said check point of said partially modified programs and/or partially added programs is stored on said priority control management table and also said partially modified programs and/or said partially added programs themselves are stored in said program area of said second memory.

13. A method for controlling programs according to claim 12, further comprising the step of executing said fixed program again by said MPU from the part following said checkpoint thereof after executing said partially modified programs or said partially added programs.

14. A method for controlling programs according to claim 12, said portable data storage device storing a first communication program for communication control between said predetermined external device and the portable data storage device, and further comprising the steps of:

(g) storing a first communication program for communication control between said predetermined external device and the portable data storage device;

(h) storing the index information of a second communication program having the same program actuating number as said first communication program in said priority control management table;

(i) storing said second communication program in said second memory according to said index information, which is provided for communication control between said predetermined external device and the portable storage device in the communication system and is different from said first communication program;

(j) determining whether the pertinent program actuating number is present on said priority control management table by searching said priority control management table;

(k) carrying out the communication control through the communication system defined by said second communication program if the pertinent program actuating number is present in the determination at said step (j); and (l) carrying out the communication control through the communication system defined by said first communication program if the pertinent program actuating number fails to be present in the determination at said step (j).

15. A method for controlling programs according to claim 10, wherein said fixed program stored in said first memory includes a write program for writing a program to be stored in said second memory and further including the step of executing said write program in response to a write command from said predetermined external device by said MPU to store said index information including the program actuating number of a program to be stored in said second memory on said priority control management table and to store the program in said program area of said second memory at the position designated by said index information.

16. A method for controlling programs according to claim 14, wherein said first communication program stored in said first memory is a communication control program defining a first predetermined control protocol and said second communication program stored in the program area of said second memory is a communication control program defining a second predetermined communication protocol.

17. A method for controlling programs according to claim 14, wherein said first communication program stored in said first memory is a communication control program defining a first predetermined cryptography communication and said second communication program stored in the program area of said second memory is a communication control program defining a second predetermined cryptography communication.

* * * * *